Sept. 22, 1964  A. J. GOLDMAN ETAL  3,150,053
STEAM-WATER MIXING DEVICE FOR STEAM-COOLED REACTOR
Filed Dec. 11, 1961  2 Sheets-Sheet 1

INVENTORS
ARTHUR J. GOLDMAN
GERARD BREIDENBACH

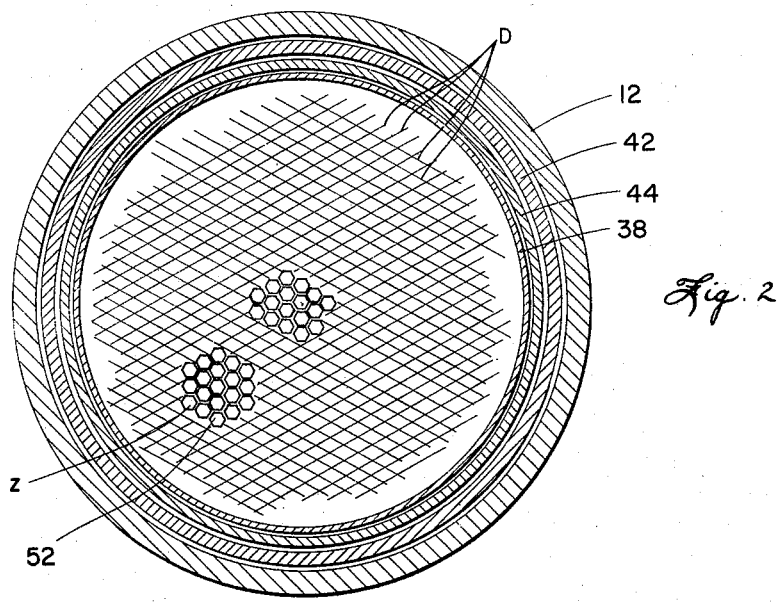
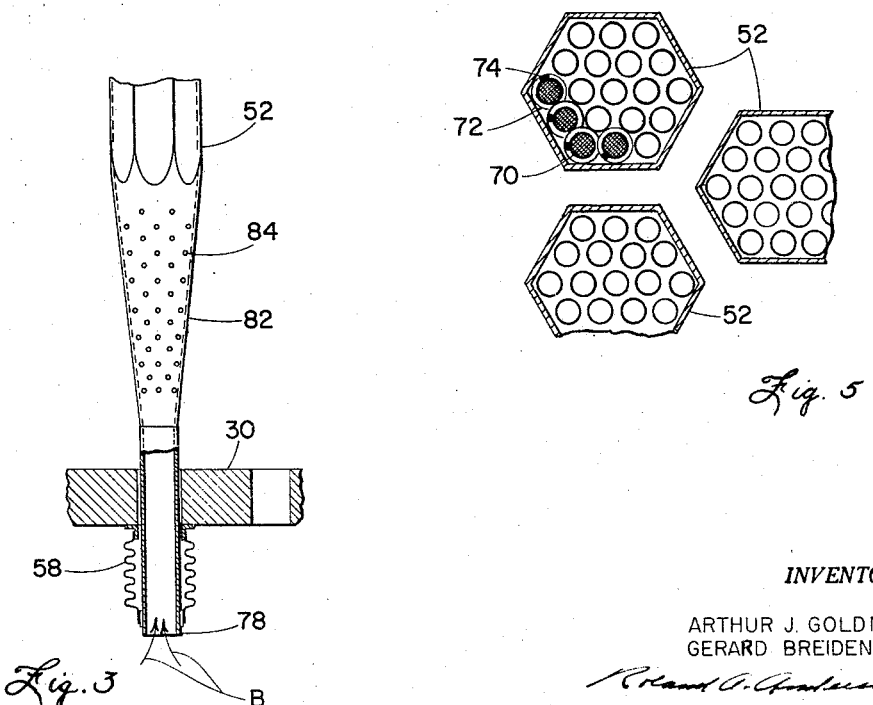

United States Patent Office 3,150,053
Patented Sept. 22, 1964

3,150,053
STEAM-WATER MIXING DEVICE FOR
STEAM-COOLED REACTOR
Arthur J. Goldman and Gerard Breidenbach, New York, N.Y., assignors to the United States of America as represented by the United States Atomic Energy Commission
Filed Dec. 11, 1961, Ser. No. 158,620
3 Claims. (Cl. 176—54)

The present invention relates to a fog-making arrangement suitable for use in a nuclear reactor and more particularly to apparatus for bringing about the uniform and efficient mixture of dry steam and water for use as the coolant within the fuel-containing tubes of a fog-cooled nuclear reactor.

It has long been the desire of workers in the field of nuclear energy to provide a nuclear reactor capable of delivering power at a rate which is comparable to fossil fuel burning power plants. While a large number of nuclear reactor power plant designs have been investigated, at the present state of the art there is no single nuclear reactor type which can deliver electrical power which is competitive in price to the fossil fuel burning plants.

One type of nuclear reactor which promises to provide certain advantages including cost reduction in the production of electrical power is the so-called fog-cooled reactor which utilizes as coolant a two-phase fluid, e.g., water and steam, and referred to as the "fog" or spray. The use of a spray or fog as a reactor coolant has many advantages over the more usual types of coolants in use. Some of the advantages are in common with boiling water, but other advantages are unique to this coolant alone. For example, the spray or fog coolant, as in the case of the boiling water, may be used in a direct cycle system without the need of intermediate heat exchangers, as is the case for sodium, organic liquid, gas and pressurized water reactors, and much lower fog-cooling pressures may be used than with pressurized water coolants for equal conditions. However, as the cooling density of the fog is much lower than either the liquid or boiling water, neutron parasitic absorption is sufficiently low to be of interest in reactors requiring high neutron economy such as natural or low enrichment $D_2O$ and graphite-moderated reactors. The effect of low coolant density leads to a weaker coupling between coolant enthalpy and reactivity and this will result in improved operational safety characteristics over the boiling water reactor systems. Other advantages of the fog-cooled reactor include a constant temperature cooling which is obtained as compared to the use of many of the other type coolants because the heating or cooling within the reactor takes place at the heat of evaporation, good heat transport characteristics, very high heat transfer coefficients below burnout, and smaller temperature rise following burnout than under sub-cooled boiling conditions.

In other words, a fog-cooled reactor manages to combine some of the important advantages associated with the boiling water reactor and those associated with the pressurized water reactor, while avoiding some of the disadvantages of both.

In order to have a practical and efficient fog-cooled reactor, it is necessary within the core of the reactor to provide a uniform mixture of the two fluid phases throughout the length of the fuel containing tubes to insure a stable condition of flow and temperature over the length of the fuel elements.

According to the present invention, this is accomplished by utilizing a unique mixing arrangement within the individual fuel containing tubes located within the core itself. By this arrangement the fuel coolant tubes form part of the mixing structure by being shaped into divergent nozzles immediately above the lower entrance into the core in order to reduce the pressure drop. A plurality of many small holes line the wall of the nozzles to break up the water into small droplets and enhance fog production. The water pressure outside the nozzle is maintained at a higher level than the dry steam pressure, and this pressure difference is maintained constant. As a result, the steam-water ratio may be varied by controlling the pressure of either the steam or water system independently.

As a result, it has been found possible by this invention to obtain an efficient means of mixing the steam and water forming the fog coolant.

It is, therefore, a principal object of this invention to provide an arrangement for mixing liquid and gas fluid phases within predetermined proportions efficiently and conveniently with a minimum of external controls.

Another object of this invention is the provision of steam and water mixing apparatus which may be used within a reactor core for producing a fog coolant therewithin.

Other objects and advantages of this invention will hereinafter become more evident from the following description made with reference to the accompanying drawings in which:

FIG. 2 is a view along 2—2 of FIG. 1;

FIG. 3 is an enlargement of detail $x$ of FIG. 1;

FIG. 5 is an enlargement of detail $z$ of FIG. 2.

Figures 1, 4:
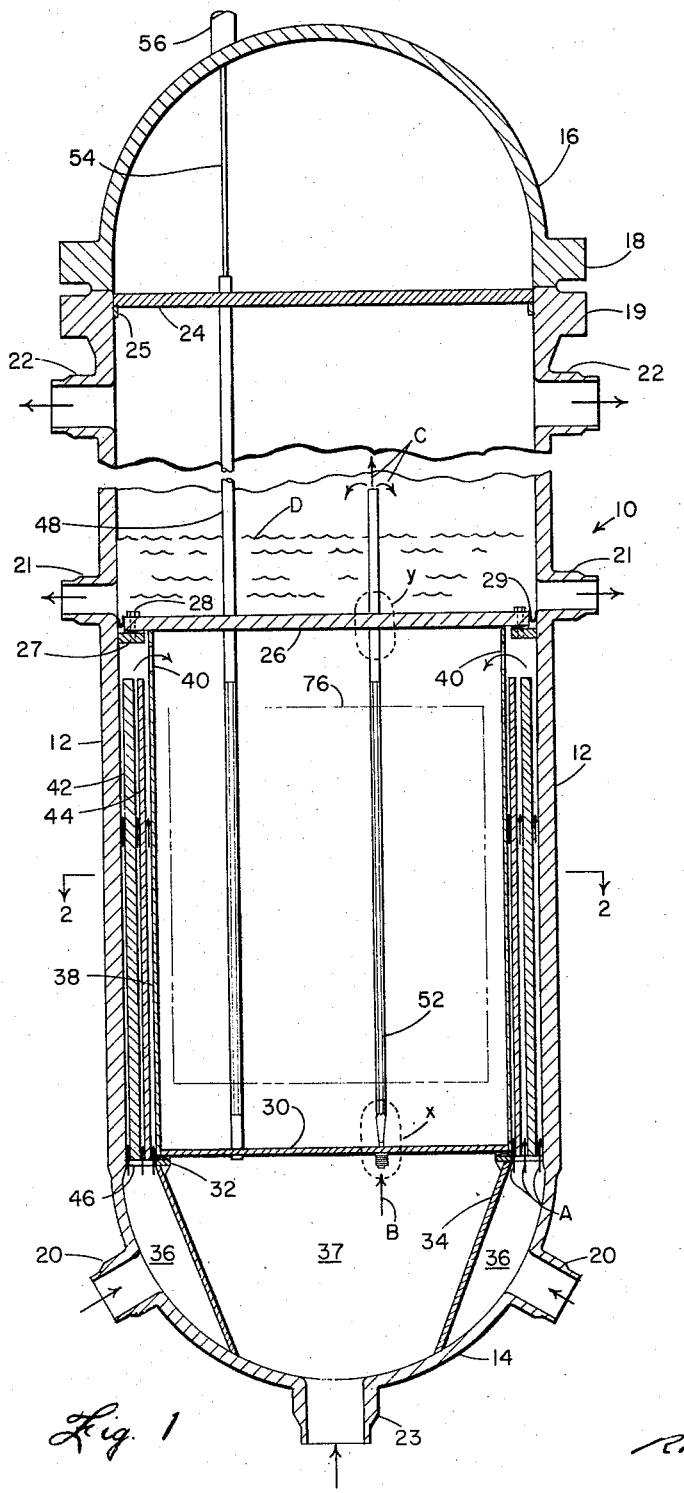
FIG. 1 is an elevation view in section of a single region fog-cooled reactor which may incorporate a preferred embodiment of this invention.
FIG. 4 is an enlargement of detail $y$ of FIG. 1.

Referring to the drawings for a preferred embodiment of this invention, wherein like numerals are used for like parts throughout the several views, there is shown, somewhat schematically, a single region fog-cooled reactor 10 which is formed from a pressure vessel 12 generally cylindrical in shape. Vessel 12 has a bottom hemispherical section 14 and a removable hemispherical top closure 16 which joins the main body of vessel 12 through flanges 18 and 19. The latter flanges are joined together with a plurality of bolts (not illustrated) as is understood in the art.

Vessel 12 is provided with a pair of water inlet nozzles 20 in the lower hemispherical section 14, a pair of water outlet nozzles 21 in an intermediate portion of vessel 12, a pair of fog outlet nozzles 22 adjacent flange 19 and a steam inlet nozzle 23 through the bottom of vessel 12.

Within pressure vessel 12, located directly beneath flange 19 is mounted a horizontal plate 24, supported by an annular ring 25 which may be attached to vessel 12 in convenient fashion. Plate 24 is provided with a plurality of holes (not shown) for a reason later to become obvious. A top grid plate 26 is similarly mounted below water nozzles 21, supported by a ring 27 and attached by bolts 28 as illustrated. An annular seal 29 attached as illustrated may be used to prevent leakage past plate 26. A bottom grid plate 30 is supported immediately above bottom hemispherical section 14 by an annular ring 32 as illustrated. Ring 32 is in turn supported in part by a frusto-conical member 34 which divides the lower portion of vessel 12 into a lower annular plenum 36 and a lower central plenum 37 for a purpose to be later described. Plates 26 and 30 are provided with a plurality of openings (not shown) for a purpose to be later described.

Extending between grid plates 26 and 30 is a cylindrical tube referred to herein as core barrel 38 which is provided with a plurality of openings 40 immediately below grid plate 26.

In the annular space formed by barrel 38 and the wall of pressure vessel 12 are provided a pair of cylindrical thermal shields 42 and 44 spaced as shown and extending upwardly from bottom grid plate 30 and terminating below annular top grid plate 26. Annular ring 32 is provided with suitable openings 46 to permit water flow from annular plenum 36 into the spaces between thermal shields 42 and 44, vessel 12 and barrel 38, as arrows A indicate. Inside of barrel 38 are located control rod housings 48 and the fuel containing coolant tubes 52 which extend between and through top and bottom grid plates 26 and 30 respectively. While only one of each is shown, it is understood that barrel 38 is filled with these members as indicated schematically by lines D in FIG. 2.

Bottom grid plate 30 supports the bottom ends of housings 48 and tubes 52 which extend through plate 30 for a reason to be explained below. The former also extend through plate 26, with tubes 52 terminating below fog outlet nozzles 22, whereas control rod shafts 54 extend out of reactor 10 through control rod nozzles 56 to permit control rod control during operation of reactor 10 as is understood in the art. Control rod housings 48 and coolant tubes 52 are hexagonal in cross-section within the core of reactor 10 for a reason to be later described.

As shown in FIG. 3, illustrating detail $x$ of FIG. 1, a bellows 58 immediately below bottom grid plate 30 for each coolant tube 52 interconnects plate 30 with the bottom of each tube 52 in order to permit a more rigid connection between tubes 52 and top grid plate 26 and also differential thermal expansion as is understood in the art. The top of each coolant tube 52 may be rolled into top grid plate 26 as illustrated in the detail of FIG. 4. There shown is a portion of a fuel element rod 62 terminating in a grappling fixture 64 used to withdraw the fuel elements or fuel assembly from each coolant tube 52. Control rod housings 48 may be similarly supported by the top and lower grid plates 26 and 30, respectively.

As seen in FIG. 2, the interior of barrel 38 is substantially filled with closely spaced fuel containing tubes 52, control rod housings 48, and while not shown, places for test instruments and testing sites. FIG. 5 gives additional details on the construction of fuel coolant tubes 52. There it will be seen that each tube 52 contains a large number of spaced cylindrical fuel rods 70 formed into a cluster as illustrated, the spacing being accomplished and maintained by wire spacers 72 attached to the outer surfaces of fuel rods 70 by tabs 74. In the particular embodiment illustrated, ½" outer diameter $UO_2$ rods clad with zircaloy-2 material. The coolant tubes 52 are also constructed of a zircaloy material. As will be later seen, the spaces between fuel rods 70 are filled with a fog coolant while the spaces between tubes 52 are filled with a light water functioning as moderator for reactor 10. Fuel rods 70 fill zone 76 indicated in phantom in FIG. 1, which is therefore the reactive portion of reactor 10.

The hexagonal shape of the coolant channels within housings 48 and fuel tubes 52 is selected in order to minimize flux maldistribution expected with cylindrical channels which result from nonuniform distribution of moderator around the fuel. However, this effect is not considered to be large and cylindrical channels may be used.

The novel arrangement for making the fog or steam-water mixture is incorporated into the bottom of each fuel coolant tube 52, as best shown in FIG. 3. There it will be noted that each tube 52 is provided with an inlet section 78 extending through bottom grid plate 30 of narrower diameter than the portion of tube 52 located within barrel 38. An expanding transition, nozzle-like section 82 is located immediately above plate 30 with a plurality of openings 84 lining section 82 which permits water to be entrained with the steam which enters tube 52 through the inlet section 78 as indicated by arrows B. The use of a large number of small holes or openings 84 breaks up the water into small droplets and this enhances the production of a uniform and fine quality fog uniquely suitable for this application.

Reactor 10 operates as follows: Water enters into pressure vessel 12 through inlet nozzles 20 filling annular plenum 36. As indicated by arrows A, the water flows upwardly through openings 46 in ring 32 into the spaces between thermal shields 42 and 44, pressure vessel 12 and the barrel 38. The water upon reaching the area immediately below top grid plate 26 passes through openings 40 into the interior of barrel 38 and down into the core of reactor 10, filling up the spaces between coolant tubes 52 and control rod housings 48, and acting as moderator for reactor 10. The water flows downwardly and thus is preheated. The water then enters fuel tubes 52 through openings 84 in section 82 of tubes 52 as described above.

At the same time, dry steam enters vessel 12 through steam inlet nozzle 23 filling up lower plenum 37. The steam enters housings 48 and tubes 52 through inlet sections 78, expanding in nozzle sections 84 as shown in FIG. 3. There the steam and water mix thoroughly forming a fine fog which surrounds the fuel elements and fills tubes 52. Travelling upward, the fog withdraws the heat of fission generated by the fuel segments within coolant tubes 52. As the fog travels upwardly, more of the water in the fog converts to steam so that the quality of the mixture goes up during its passage upwardly. The fog leaves coolant tubes 52 at the top as shown by arrows C and then exits through outlet nozzles 22 where the fog is utilized directly in the power conversion apparatus or in means to separate the steam from the water, supplying the steam entering vessel 12 through nozzle 23. Water separated from the fog collects to a level D above top grid plate 26, and this water is drained out through nozzles 21 for reuse.

While not illustrated, a separator may be incorporated into the space between top grid plate 26 and plate 24 to separate out all of the water within the reactor so that only dry steam can be withdrawn from the vessel outlets 22.

As already noted, the mixing arrangement of FIG. 3 utilizes a very large number of small holes in the wall of the nozzle sections 82 to break up the water into small droplets and enhance the production of fog. The pressure of the water surrounding sections 82 should be maintained at a higher level than the steam entering inlet sections 78. This pressure difference should be maintained constant in order to obtain a uniform and closely regulated operation of reactor 10 and this may be accomplished if desired by utilizing the hydrostatic head of the water in the moderator space thereby interlocking the steam and water pressurizing systems, or by any other means known in the art. The steam-water ratio may be selected at any particular desired value by controlling the pressure of the steam or water system independently.

The nuclear features of a single region fog-cooled reactor as described above are given in Table I below:

*Table I*

| | |
|---|---|
| Net electrical output, $MW_e$ | 200 |
| Fuel | $UO_2$ |
| Fuel rod diameter, in. (clad O.D.) | 0.500 |
| Number of rods per fuel position | 19 |
| Moderator to fuel volume ratio | 1.3 |
| Minimum separation between rods, in. | 0.075 |
| Clad thickness, in. | 0.025 |
| Control rod to fuel positon ratio | 1/12 |
| Core height to diameter ratio | 1.00 |
| Maximum to average power in the fuel cluster | 1.17 |
| Fraction of thermal power generated in the fuel | 0.93 |
| Net plant efficiency— | |
| at 800 p.s.i. | 0.30 |
| at 1000 p.s.i. | 0.31 |
| at 1200 p.s.i. | 0.32 |
| Maximum heat generation per unit length of fuel, $q'_{max}$, watts/cm.: | |
| Nominal | 400 |
| Perturbed | 665 |

The dimensions and other parameters of such a reactor are given in Table II below:

Table II

Basis of nuclear results:
Fuel element, $UO_2$ rods in hexagonal cluster.

| | |
|---|---|
| Number of rods/cluster | 19 |
| Fuel pellet diameter, in. | 0.450 |
| Cladding, in. | 0.025 |
| Cladding material | Zircaloy-2 |
| O.D. of cladding, in. | 0.500 |
| Minimum spacing between rods, in. | 0.100 |
| Shroud tube material: | |
|    I.D., in. | 3.14 |
|    Thickness, in. | 0.020 |
| Core height, ft. | 10.85 |
| Core diameter, ft. | 10.85 |
| Coolant | Fog |
| Average channel quality, percent: | |
|    Zero power | 15 |
|    Full power | 25 |
| Coolant pressure, p.s.i. | 1000 |
| Moderator temperature, °F. | 540 |
| Optimum moderator to fuel ratio, $V_M^*/V_{UO_2}$ | 1.2–1.4 |
| Fuel enrichment | 1.40 |

Thus, it is seen that there has been provided a fog-cooled reactor arrangement incorporating a novel, efficient and effective arrangement for mixing the steam and water for improved operation of the reactor. In the particular arrangement, water from the moderator space is injected into the steam directly within the fuel containing tubes resulting in a more efficient perheating arrangement for the water and also to insure a uniform and controlled fog mixture. By this particular steam-water arrangement, it is possible to obtain a fog-cooled reactor which obtains many of the benefits of the boiling water reactor and yet avoids many of the disadvantages generally associated with boiling water type reactors.

In locating the mixing arrangement within the core of the reactor itself, there is minimized the possibility that the character of the fog would be changed while being transferred is almost self-regulating since it depends merely, once installed, on the relative pressures of the steam and water which are parameters that are readily controllable as is understood in the art. Therefore, this particular mixing arrangement is incorporated into the reactor described above and operates to enhance the utility and advantages of this nuclear reactor as compared to other types mentioned above.

While, of course, only a preferred embodiment of this invention has been described, it is understood that many modifications and alterations may be made without departing from the principles of this invention and it is intended that the invention be defined by the scope of the appended claims and not limited by the particular embodiment illustrated and described.

What is claimed is:

1. In combination with a fog-cooled nuclear fission reactor which comprises a pressure vessel, a plurality of elongated coolant tubes vertically extending within said vessel, a pair of upper and lower flat horizontal plates supporting said tubes, said tubes terminating and having bottom openings below said lower plate and outlets above said upper plate, means surrounding said tubes and forming an annular space extending from the bottom of said vessel to said upper plate, means for passing liquid water into said annular space adjacent the bottom of said vessel, said surrounding means having openings adjacent said upper plate to permit said water travelling through said annular space to pass into the spaces between said coolant tubes, and means for passing dry steam through the bottom of said vessel into the space surrounded by said annular space below said lower plate, said steam entering the bottom openings of said coolant tubes: steam-water mixing means comprising a diverging section extending upwardly from said lower plate in each said coolant tube having small openings in the walls of said section to permit water to enter each said tube in the form of fine droplets to mix with the steam therein to form fog which travels up through and out of the outlets of said tubes, withdrawing the heat of fission of said reactor.

2. The reactor of claim 1, including means for maintaining the pressures of the steam and water entering said coolant tubes at a predetermined ratio.

3. The reactor of claim 1, including means for maintaining the pressure of said water surrounding said diverging sections at a constant higher level than the pressure of said steam entering said coolant tubes.

References Cited in the file of this patent
UNITED STATES PATENTS

| | | |
|---|---|---|
| 2,184,185 | Gerhold | Dec. 19, 1939 |
| 2,708,656 | Fermi et al. | May 17, 1955 |
| 2,782,158 | Wheeler | Feb. 19, 1957 |
| 2,825,543 | McCracken | Mar. 4, 1958 |

OTHER REFERENCES

"Fog Coolant Technology and Its Application to Nuclear Reactors," George Sofer, June 4–7, 1962, "Nuclear Congress," Engineers Joint Council.

"Heavy-Water Reactors Cooled by Light Steam and Water Mixtures," by M. Silvestri—NRC, TT–985, National Research Council of Canada (Technical Translation 985); Translated by D. A. Sinclair; Ottawa, 1961.

"Heavy-Water Reactors Cooled with Light Water-Vapor Mixtures," M. Silvestri (CISE, Segrate, Italy); Energia Nuclear (Milan), 8:209–12 (March 1961); (in Italian); referred to in NSA, vol. 15 No. 14; 18992. (For a translation see: "Heavy-Water Reactors Cooled by Light-Steam and Water Mixtures," by Silvestri; Canadian, 9 pages; available from ICL (John Crerar Library, Translation Center).) Referred to in NSA, Jan. 31, 1962; vol. 16, No. 2; index, page 96.